(12) United States Patent
Perlman

(10) Patent No.: US 7,451,839 B2
(45) Date of Patent: Nov. 18, 2008

(54) SYSTEM AND METHOD FOR POWERING A VEHICLE USING RADIO FREQUENCY GENERATORS

(75) Inventor: Stephen G. Perlman, Palo Alto, CA (US)

(73) Assignee: Rearden, LLC, San Francisco, CA (US)

( * ) Notice: Subject to any disclaimer, the term of this patent is extended or adjusted under 35 U.S.C. 154(b) by 330 days.

(21) Appl. No.: 11/136,946

(22) Filed: May 24, 2005

(65) Prior Publication Data

US 2006/0266564 A1   Nov. 30, 2006

(51) Int. Cl.
*B60L 9/00* (2006.01)
(52) U.S. Cl. ............... 180/2.1; 180/167; 180/65.1; 180/65.3
(58) Field of Classification Search ............ 180/2.1, 180/167, 168, 169, 65.1, 65.2, 65.3
See application file for complete search history.

(56) References Cited

U.S. PATENT DOCUMENTS

| | | | | |
|---|---|---|---|---|
| 5,573,090 | A * | 11/1996 | Ross ............. | 191/10 |
| 5,644,207 | A * | 7/1997 | Lew et al. ......... | 320/101 |
| 5,982,139 | A * | 11/1999 | Parise ............ | 320/109 |
| 6,114,834 | A * | 9/2000 | Parise ............ | 320/109 |
| 6,792,259 | B1 | 9/2004 | Parise | |
| 6,982,653 | B2 * | 1/2006 | Voeller et al. ...... | 340/933 |
| 7,068,991 | B2 * | 6/2006 | Parise ............ | 455/343.1 |
| 2003/0200227 | A1 * | 10/2003 | Ressler ........... | 707/104.1 |
| 2006/0184209 | A1 * | 8/2006 | John et al. ........ | 607/45 |
| 2006/0199620 | A1 * | 9/2006 | Greene et al. ...... | 455/572 |

OTHER PUBLICATIONS

Joho, D., et al., "Articles of the Electronic Information And Communication Society", vol. J87-C No. 5, May 2004, pp. 1-19.
Kreith, F., et al., "Efficiency of Advanced Ground Transportation Technologies", Journal of Energy Resources Technology, Copyright 2002 by ASME, Sep. 2002, vol. 124, pp. 173-179.
"Well-to-Wheels Analysis of Advanced Fuel/Vehicle Systems—A North American Study of Energy Use, Greenhouse Gas Emission, and Criteria Pollutant Emissions", May 2005, 238 pages.
Demirodoeven N., et al., "Hybrid Cars Now, Fuel Cell Cars Later", Aug. 13, 2004, vol. 305 Science, pp. 974-976, www.sciencemag.org.

(Continued)

*Primary Examiner*—Christopher Ellis
*Assistant Examiner*—John D Walters
(74) *Attorney, Agent, or Firm*—Blakely, Sokoloff, Taylor & Zafman, LLP

(57) ABSTRACT

A system and method are described for powering a vehicle using radio frequency ("RF") signals. For example, a method according to one embodiment of the invention comprises: positioning a plurality of RF generators beneath the road surface of a roadway, the RF generators configured to transmit RF signals in the direction of vehicles traveling over the roadway; coupling a rectenna on a vehicle, the rectenna configured to receive the RF signals transmitted from the RF generators and to generate power from the RF signals; and using the power generated by the rectenna to power the vehicle.

17 Claims, 15 Drawing Sheets

OTHER PUBLICATIONS

Hoeffert, M., et al., "Climate Change and Energy, Overview", Encyclopedia of Energy, vol. 1, Copyright 2004, Elsevier, Article No. NRGY : 00396, 23 pages.

Toyota Special Reports, Toyota FCHV- The First Step Toward the Hydrogen Society of Tomorrow, "Accelerating Towards a Hydrogen Society through Fuel Cell Vehicles", pp. 1-8.

Wampfler, Inc., Home page, Wampfler, Inc., KY, USA- Wampfler Group, 1 page, printed on Apr. 17, 2006, http://www.wampfler.us/.

Friends of CRC, "The Friends of CRC Association", Home page, printed on May 14, 2008, 3 pages, http://www.friendsofcrc.ca/.

Tesla's Experiments With Electric Cars, Teslas FAQ No. 15, Interesting Facts About Nik . . . , Twenty First Century Books, Could you write something about Tesla's experiments with electric cars?, p. 1 of 1, http://www.tfcbooks.com/teslafaq/q&a_015.htm.

Regenerative Power and Motion, "Electric Highway Vehicles", printed on Apr. 17, 2006, pp. 1-12, http://home.earthlink.net/~fradella/car.htm.

Oman, H, et al., "Eventful Developments in Energy Conversion", Conference Report, IEEE AESS Systems Magazine, Jan. 2002, pp. 34-40.

PCT Search Report, PCT/US06/14854, mailed May 8, 2008, 3 pages.

Written Opinion, PCT/US06/14854, mailed May 8, 2008, 3 pages.

\* cited by examiner

SYSTEM AND METHOD FOR POWERING A VEHICLE USING RADIO FREQUENCY GENERATORS

BACKGROUND OF THE INVENTION

1. Field of the Invention

This invention relates generally to the field of vehicle propulsion systems. More particularly, the invention relates to an improved system and method for powering a vehicle using radio frequency signals.

2. Description of the Related Art

1. Introduction

Developing vehicles which reduce reliance upon fossil fuels is a matter of critical global importance. Fossil fuels (e.g., gasoline, diesel fuel, natural gas) are used in the vast majority of vehicles in the world because of fossil fuels' high energy density, fast refueling time, relatively low cost, and the maturity of internal combustion ("IC") engines that run on fossil fuels.

The world's heavy reliance on fossil fuels for vehicular power has resulted in a number of problems and concerns. IC engine emissions, despite increasingly stringent controls in many countries, contribute significantly to air pollution and release significant quantities of carbon dioxide, potentially harming the ozone layer and/or contributing to global warming. Many of the world's largest reserves of fossil fuels are in politically unstable areas of the world. Moreover, the world has a finite supply of fossil fuel resources that can be practically obtained. While the exact remaining supply of fossil fuel resources is unknown and a matter of debate, there is universal agreement that at some point (perhaps 25 years, perhaps 100 years) supplies will peak and within an accelerated timeframe thereafter, supplies will be exhausted. Once the milestone event of peak supply and rapid depletion occurs, the cost of fossil fuel is likely to rise dramatically, further worsening the ongoing practicality for society to rely largely on fossil fuels.

A number of prior art systems have been developed and/or proposed over the last century that either eliminate the use of fossil fuels or reduce the use of fossil fuels. In particular, a number of prior art systems have been designed to utilize electricity sourced from the local power grid as energy for vehicle propulsion. Although a large percentage of electrical energy in the current US and world power grid is generated from fossil fuels, with electric-powered vehicles, countries have energy choices when generating electricity such as the type of fossil fuel used (e.g. natural gas, diesel, or coal), nuclear power, hydroelectric power, solar power, and/or wind power. However, with fossil fuel-powered vehicles the energy choices are limited to fossil fuels such as gasoline, diesel, and natural gas that are in liquid or gaseous form and are highly portable. Also, currently in the US, the cost of electric energy to produce a given watt output from an electric motor is typically less than the cost of gasoline to produce a given watt output from a gasoline engine. Of course, it is a complex analysis to compare an electric vehicle's overall efficiency to a gasoline vehicle's, but generally speaking, the energy costs for electric vehicles are less expensive per mile compared to similar gasoline vehicles.

Each prior art system developed and/or proposed in the last century to reduce fossil fuel dependence has its advantages and disadvantages, but to date, none has provided a solution which has the convenience and efficiency of a modern IC-powered automobile and offers a long-term solution that eliminates reliance on fossil fuels Several such prior art systems are reviewed here.

2. Current Vehicle Propulsion Systems (a) Internal Combustion Engines

FIG. 1 illustrates a vehicle powered by a traditional internal combustion ("IC") engine 116, the most common vehicle configuration today. Fuel from a fuel source 180 (e.g., an oil refinery) is transported to fuel pumps 181 maintained at gas stations. Users purchase the fuel at the gas station, and fill up a fuel tank 114 coupled to the vehicle. The fuel is then provided to the IC engine 116 via a fuel line 115.

The IC engine 116 burns the fuel and provides torque to a drive train 117 which interfaces with a transmission 182. The transmission is necessary to allow the engine to run at a rate (typically measured in RPM) which is not directly related to the speed of the vehicle. For example, when the vehicle is stopped (e.g., at a red light), the transmission allows the engine to keep running. Conversely, when the vehicle is moving at a high velocity (e.g., on the highway), the transmission allows the engine to run at a disproportionately low rate. A drive shaft 130 from the transmission 182 applies a force to cause the wheels 111 of the vehicle to rotate. FIG. 1 also illustrates a passenger compartment 100 for containing passengers 101 and a cargo compartment 102 (e.g., a trunk) for cargo 103.

The tires 111 of the vehicle illustrated in FIG. 1 are in contact with a standard road surface or track 150 which may be constructed using various materials (e.g., tar, concrete, steel, etc). In addition, various different materials may be used for the road or track bed 151 beneath the road or track surface 150 (e.g., gravel, wood, soil, etc). A certain amount of debris and/or precipitation 152 may also be found on top of the road surface in a typical outdoor environment.

(b) Electrically-Powered Vehicles

FIG. 2 illustrates a vehicle powered by an electric motor 124. A power source 190 (e.g., the US or international power grid) supplies power to a port 129 on the vehicle via an electric interface 191, which may include a set of connectors, a voltage regulator and/or a transformer. The port 129 is electrically coupled to a charger 127 which charges a set of batteries 122. The batteries provide power to the electric motor 124. A power split device 118 receives current from the electric motor and generates torque via a drive shaft 130 thereby causing the wheels 111 of the vehicle to rotate. In one embodiment, the power split device 118 may include a gearing transmission. Using the forward momentum of the vehicle, the power split device 118 powers a generator 120 which generates an electric current for charging the batteries 122 when the vehicle is breaking or going down hil by recovering energy from the forward momentum of the vehicle. Two examples of the electric vehicle shown in FIG. 2 are the Honda EV+ and the Saturn EV1.

(c) Hybrid Vehicles

FIG. 3 illustrates an exemplary "hybrid" vehicle which runs on both gas and electricity. The power split device 118 in this vehicle allows couplings 125 and 117 to work together to power the drive shaft. More specifically, this vehicle includes both an IC engine 116 and electric motor 124 for generating torque on a drive shaft 130 via the power split device 118. As in the vehicle in FIG. 2, this vehicle also includes a generator 120 for charging the batteries 122 using the forward momentum of the vehicle (e.g., when the vehicle is breaking or going down hill). Examples of the vehicle shown in FIG. 3 include the Lexus® RX400h (note, however, that this vehicle is available with a second electric motor to drive the rear wheels) and the Toyota® Prius®.

FIG. 4 illustrates a hybrid vehicle which includes both an IC engine 116 and electric motor 124. However, unlike the vehicle shown in FIG. 3, this vehicle includes an electricity port 129 and charger 127 for charging the batteries using power from an electric power source 190 (e.g., the US power grid) through electricity interface 191. Given the fact that this vehicle can charge using a standard electrical connection, the batteries 122 of this vehicle are typically larger and can supply more power than the batteries of the vehicle shown in FIG. 3.

(d) Hydrogen Vehicles

FIG. 5 illustrates a vehicle which is similar to the vehicle shown in FIG. 2 but which uses a hydrogen fuel cell 196 to charge the set of batteries 122. The batteries 122 are used in hydrogen-powered vehicles because the fuel cell 196 cannot produce sufficient instantaneous power levels for acceptable vehicle acceleration. Like gasoline, hydrogen from supply 198 is provided to the vehicle via a fuel port 112 and is stored within a hydrogen storage chamber 194.

One problem with hydrogen vehicles is that hydrogen is not readily available as a fuel source. Generally, fossil fuels (e.g. natural gas) are used to produce hydrogen, but this defeats the purpose of a non-fossil fueled vehicle. Although hydrogen may also be produced using electrolysis powered by a electrical source, this process is inefficient and makes hydrogen an unreasonably expensive fuel source.

(e) Conductively-Powered Vehicles

FIG. 6 illustrates a prior art conductively-powered electric vehicle in which power rails/cables 691 are coupled to a power source 190. A power cable 692 is used to establish an electrical connection between the power rails/cables 691 and an electrical port 129 on the vehicle. The port 129 is electrically coupled to a charger 127 which powers a set of batteries 122 which, in turn, provide power to an electric motor 124. The electric motor 124 creates torque to power a drive shaft 130 which rotates a set of tires or wheels 111. As illustrated in FIG. 6, the power source 190 may be connected to the train by a combination of power rails or cables 691 and track 150 (e.g., as in the case of electrically powered trains).

There are many examples of prior art electric vehicles that are powered conductively by an external power source that is physically (i.e., conductively) attached. Such vehicles follow the general architecture illustrated in FIG. 6. Power source 190 is coupled through power connection 693 to power rail(s) or cable(s) 691. Unlike electricity interface 191 of FIG. 2, which couples electricity from a recharging station at a fixed location, power rail(s) or cables(s) 691 in FIG. 6 couple electricity with long and continuous electrical conductors for carrying power over the extent of the vehicle's intended travel (e.g., the two overhead power cables over electric bus routes in San Francisco), and the power cable 192 of FIG. 3 is replaced by power cable 692 that has a conductive interface 694 that rolls or slides on power rail(s) or cable(s) 691 (e.g., the two overhead connectors on electric buses in San Francisco that couple to the two overhead power cables). In some cases, the two conductors of power source 190 are split between a potentially dangerous non-ground single conductor power connection 693 coupled to power rail or cable 691 (e.g. the so-called "third rail" of the New York City subway system), and a harmless ground connection 693 coupled to a conductive track 150 (e.g., the track rails of the New York City subway system). In such a system the power rail or cable 691 typically is physically inaccessible to prevent accidental contact by a person or animal that might result in electric shock.

The charger 127 and batteries 122 shown in FIG. 6 provide temporary power in the event of intermittent connection loss to the power source. However, such vehicles may also be constructed without battery backup with a direct power connection from electricity port 129 to electric motor 124. Also, such vehicles often have a direct mechanical coupling 130 from the electric motor 124 and the tire or wheel 111.

Electric trains or trolleys with powered overhead wires are a common example of conductively-powered electric vehicles. Toy slot cars are another example, with two wires embedded in the track that are coupled to two-wire mesh connectors on the bottom of the car.

Less well known is DICK FRADELLA, ELECTRIC HIGHWAY VEHICLES . . . TECHNOLOGY ASSESSMENT OF FUTURE INTERCITY TRANSPORTATION SYSTEMS published in 1976 titled by University of California at Berkeley's Institute for Transportation Engineering. In this publication, a conductive rolling contact system for electric vehicles on highways was proposed. Using this system, an electric vehicle would have an extended tether that would connect to recessed power strips on the highway and conductively draw power from the highway. According to a website apparently maintained by the paper's author (http:llhome.earthlink.net/~fradella/car.htm) the US DOT and DOE rejected such a conductive system out of concerns that people might be electrocuted by the conductive power strips. Independent of electrocution risk, another substantive issue was that cars so connected to the conductive power strips would be quite restricted in their maneuverability, much like toy slot cars, in order to utilize the conductive power source. This would require substantial changes to existing car designs and driving procedures. In addition, debris or precipitation 152 (e.g. snow, ice, mud, oil, gravel, trash) could obstruct or interfere with the conductive interface.

(f) Inductively-Powered Vehicles

Another type of vehicle that does not directly rely upon fossil fuels is an inductively-powered electric vehicle. Electromagnetic induction is formally defined as the production of electrical potential difference (voltage) across a conductor located within a changing magnetic flux. A practical example of induction is seen in a transformer. There is no conductive connection between the primary and secondary sides of a transformer; the primary and secondary sides are simply coils of wire in close proximity to one another. When alternating current (AC) is applied to the primary side of a transformer, it induces an AC current in the secondary side of the transformer.

Induction can also be achieved between two parallel non-connected conductors in close proximity to one another. FIG. 7 illustrates how this principle has been applied in prior art inductively-powered electric vehicles. Power source 190 powers primary power supply 791, providing AC power (e.g. 10 to 25 KHz AC is used in a system designed by Wampfler AG of Rheinstrasse, Germany; see www.wampfler.com), which is coupled through power connection 792 to primary cable 794 (which loops back through another cable to power connection 792). Typically, the primary cable 794 is buried within a few centimeters of the surface of the road or track bed 151 or above the surface in an insulated enclosure.

Secondary pickup 795 contains a long conductive element which, depending on the clearance from the vehicle to the road or track bed, may have to be extended from the vehicle body. Secondary pickup 795 must be quite close (within a few centimeters) and maintained in parallel to the primary cable 795 as the vehicle moves. Secondary pickup 795 is coupled to secondary regulator 793 which serves to regulate voltage fluctuations caused by variations in the distance and alignment between secondary pickup 795 and primary cable 794. Secondary regulator 793 is coupled to charger 127, which is coupled through cable 126 to charge batteries 122 which couple through cable 123 to electric motor 124, and/or secondary regulator 793 may be coupled directly to electric motor 124, if the vehicle is to operate only from inductive power without batteries. Electric motor 124 is coupled by mechanical coupling 130 to drive tire or wheel 111.

There are only a few examples of inductively-powered electric vehicles. Wampfler AG, for example, has deployed several inductively-powered systems for electric vehicles. Inductive power has been used for vehicles on manufacturing floors and in other controlled environments. Because of the precise and close relative spacing requirements (e.g. ±25 mm in one Wampfler AG system) for inductive primaries and secondaries, inductive power transmission is difficult to apply generally to vehicles which may have to operate in a hostile outdoor environment. For example, the debris or precipitation 152 shown in FIG. 7 may obstruct a secondary pickup 795 with only a few centimeters of position tolerance.

(g) Wireless Power Transmission

Transmission of power through radio waves ("wireless power" or "RF power") was pioneered by Nikola Tesla. His Tesla Coil, which demonstrates the principle of RF power transmission, has been a common fixture in science museums and science classes for decades, but it has found little practical application because it is quite inefficient as a wireless power transmitter. Nonetheless, Tesla envisioned a world where wireless power was ubiquitous. There was even one report (see New York Daily News, Apr. 2, 1934, "Tesla's Wireless Power Dream Nears Reality") that Tesla was developing a wirelessly-powered car, details of which were "closely guarded secrets." However, the speculations of this article were never corroborated. A World-Wide Web resource site on Nikola Tesla (www.tfcbooks.com) has compiled a significant amount of information related to Tesla's work. Regarding electric-powered automobiles, the web site states: "While there is no corroborated evidence that Tesla ever built an electric automobile, he is known to have encouraged others to pursue the idea of electric propulsion." (http://www.tfcbooks.com/teslafaq/q&a_015.htm).

Since Tesla's first work with wireless power transmission one hundred years ago, there have been a number of other wireless power transmission experiments and demonstrations.

In the 1960s, William C. Brown helped develop the rectifying antenna ("rectenna"), which converts radio waves to direct current ("DC"). An exemplary rectifying antenna is illustrated in FIG. 8. As taught by William C. Brown and others, a rectenna, when exposed to radio waves (typically in the microwave band) receives transmitted power and converts the microwave power to DC power. A typical rectenna consists of multiple rows of dipole antennas where multiple dipoles belong to each row. Each row is connected to a rectifying circuit which consists of low pass filters 801 and a rectifier 802. A rectifier is typically a GaAs Schottky barrier diode that is impedance-matched to the dipoles by a low pass filter 801. A low-pass filter 801 is a device that cuts frequencies off above a certain point and allows all other frequencies to pass through. Rectennas may also employ capacitors 803 to store charge as it flows through the receiving sub-systems.

Rectenna technology is well-understood by those skilled in the art, and there have been a number of prior art refinements, including U.S. Pat. No. 3,887,925 and U.S. Pat. No. 4,943,811. Efficiencies as high as 90% have been achieved from transmission of power to reception of power by a rectenna.

Transmission of wireless power to rectennas has been used for, and has been proposed for, many applications. In 1964, William C. Brown demonstrated the transmission of wireless power to a tethered model helicopter with a rectenna.

In the 1980s, the SHARP (Stationary High Altitude Relay Plafform) project resulted in a microwave-powered electric airplane with a 15-foot wing span. Its maiden voyage was in 1987, and it eventually was flown to a height of 1500 feet by beaming 12 kilowatts of RF power from the ground to the plane for more than an hour. Only a small fraction of the transmitted RF was received by an on-board rectenna. The work is currently described at http://friendsofcrc.ca/SHARP/sharp.html and in U.S. Pat. Nos. 4,943,811; 5,045,862; 5,321,414; 5,563,614 and Canadian Patent Nos. 1,307,842; 1,309,769; 2,006,481; 2,011,298. A ground power transmission system transmitted microwaves to the plane.

Hobbyists and students have also used wireless power for powering motors for other applications. Akshay Mohan describes experiments he conducted in 2002 with wireless power transmission. His initial goal was to develop a vehicle that could divide itself so that at one point in time it could be a family car, and then divide itself at another point in time so that each part individually could be a vehicle a person could drive. He thought initially about coupling independent suspension and transmission mechanisms, and then considered using wireless power transmission to distribute power amongst the various independent parts of the vehicle. The power transmitted was very low power, and was used to power a motor removed from a toy car. The experiment is described at the following URL: http://www.media.mit.edu/physics/pedagogy/fab/fab_2002/personal_pages/akshay/mit.edu/index42.html

SUMMARY

A system and method are described for powering a vehicle using radio frequency ("RF") signals. For example, a method according to one embodiment of the invention comprises: positioning a plurality of RF generators beneath the road surface of a roadway, the RF generators configured to transmit RF signals in the direction of vehicles traveling over the roadway; coupling a rectenna on a vehicle, the rectenna configured to receive the RF signals transmitted from the RF generators and to generate power from the RF signals; and using the power generated by the rectenna to power the vehicle.

BRIEF DESCRIPTION OF THE DRAWINGS

A better understanding of the present invention can be obtained from the following detailed description in conjunction with the drawings, in which.

DETAILED DESCRIPTION OF PREFERRED EMBODIMENTS

Described below is an improved apparatus and method for powering a vehicle. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

One embodiment of the invention powers a vehicle using wireless radio frequency signals transmitted from an antenna embedded within a roadway to a rectenna on the vehicle. The rectenna may be positioned on the underbody of the vehicle and may be configured to receive the RF signals as the vehicle passes over the transmitting antenna.

Figure 9:
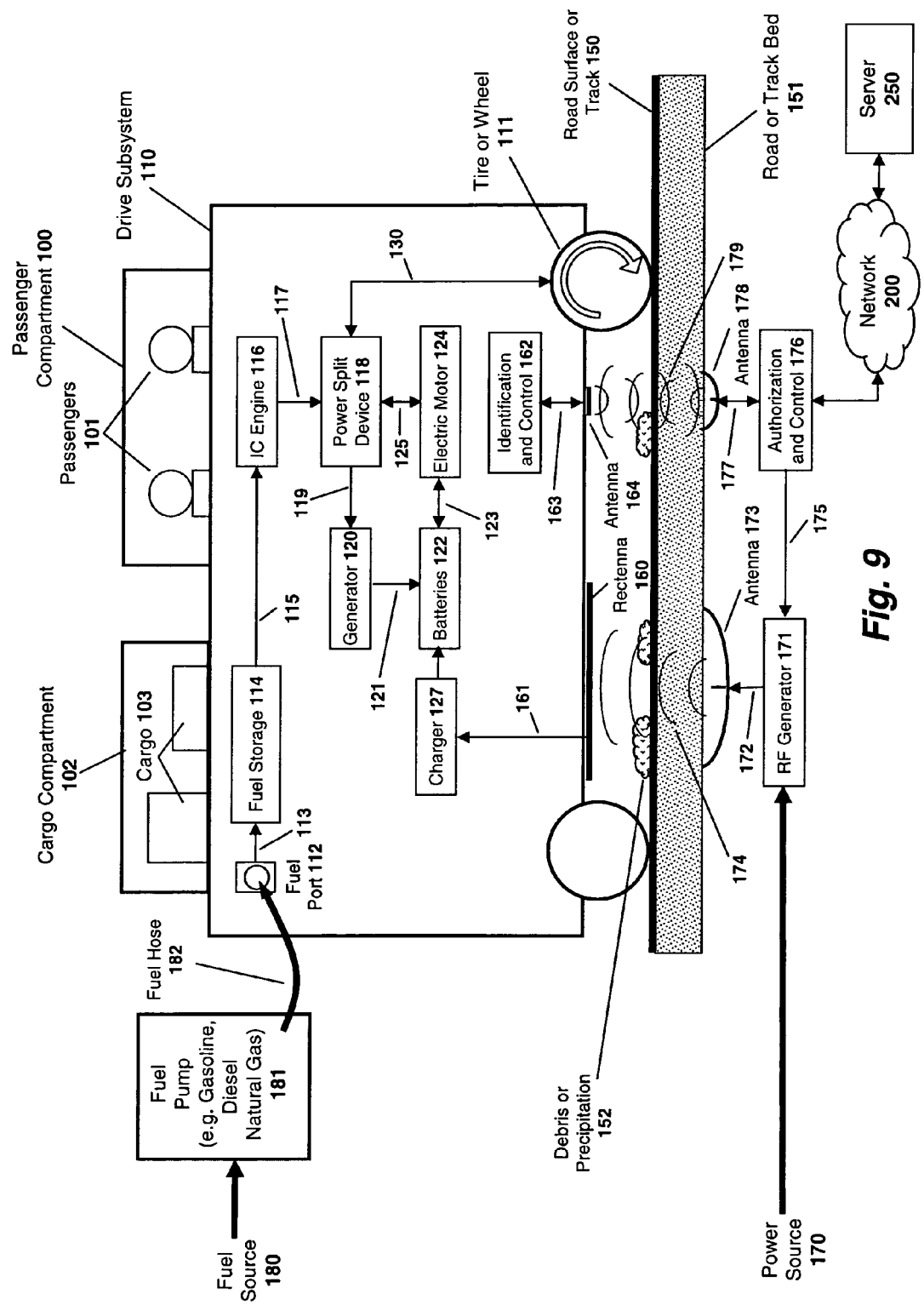
FIG. 9 illustrates one embodiment of the invention in which RF generators are configured beneath a road surface.

FIG. 9 illustrates one embodiment which includes an RF generator unit 171 positioned beneath the road surface 150 and coupled to a transmitting antenna 173. The RF generator is configured to transmit RF signals 152 via antenna 173 in the direction of vehicles traveling over the road surface 150. In one embodiment, the RF signals 152 are microwave signals. However, the underlying principles of the invention are not limited to any particular portion of the RF spectrum.

In addition, in one embodiment, the RF generator 171 uses an electrical connection to the electrical power grid as a power source 170. However, once again, the underlying principles of the invention are not limited to any particular power source.

In one embodiment of the invention, a rectenna 160 is coupled to the underside of a vehicle and is positioned to receive the RF signals transmitted from the RF generator 171. The rectenna 160 converts the RF signals into DC electrical power. Specifically, the rectenna 160 provides current to a charger unit 127 via electrical connection 161. Using the power from the rectenna 160, the charger unit 127 charges a set of batteries 122. The charger 127, batteries 122, generator 120, electric motor 124 and power split device 118 may be the same (or similar) types as those used in prior electric vehicles. In addition, as illustrated, the vehicle may also be equipped with an IC engine 116 (coupled to the power split device 118 as in prior vehicles).

In one embodiment, a series of RF generators such as RF generator 171 are positioned beneath certain lanes of a highway, separated from one another by a specified distance. As such, vehicles equipped with rectennas 160 and associated charging circuitry are provided with a continuous power source as they drive over these lanes. One embodiment of the invention provides RF generators 171 only beneath the commuter lanes (e.g. sometimes called "High Occupancy Vehicle", HOV, or Carpool lanes) of the highway. However, the underlying principles of the invention are not limited to specific types of lanes configured with RF generators.

Figure 6:
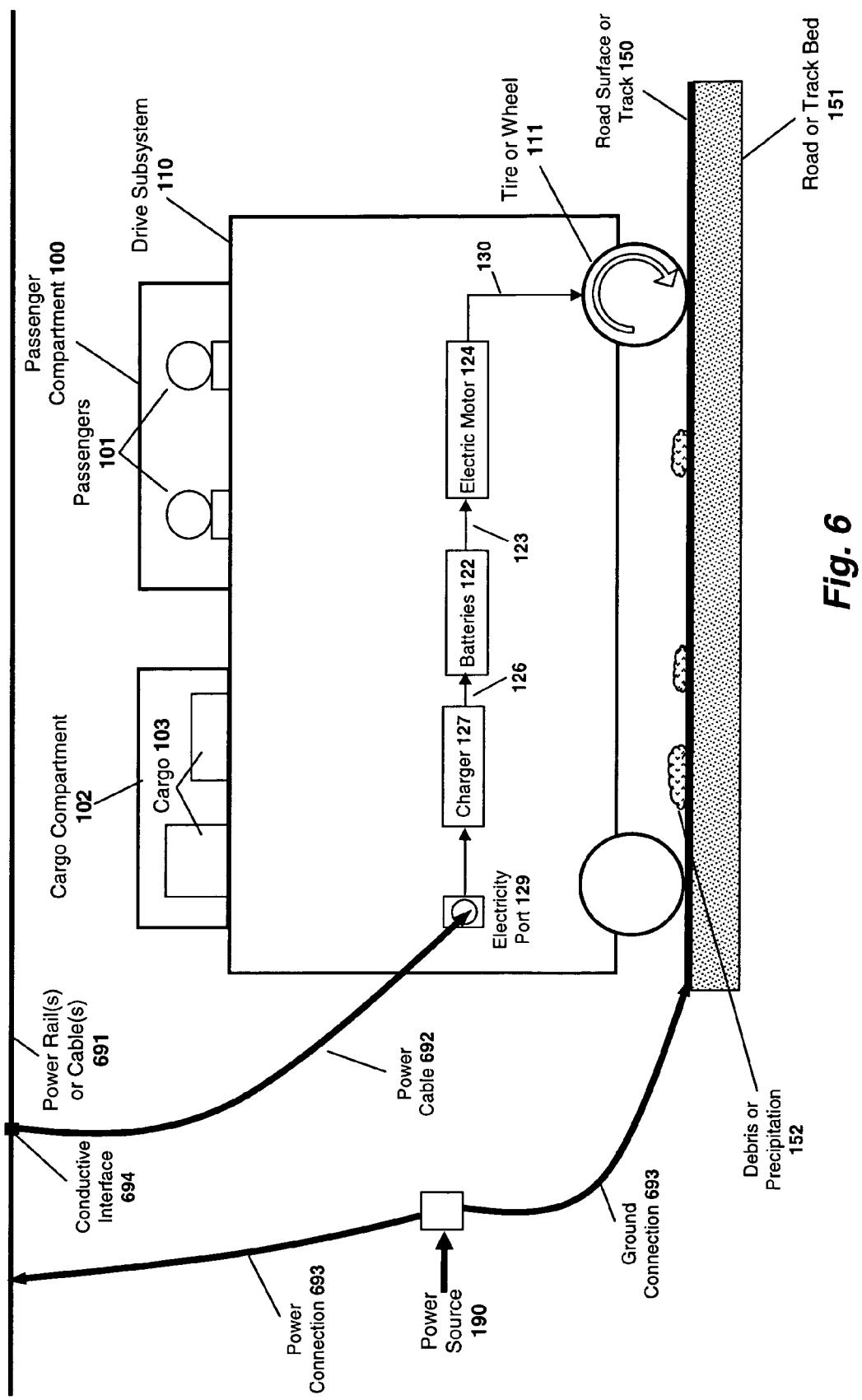
FIG. 6 illustrates a prior art conductively-powered electric vehicle.
Figure 7:
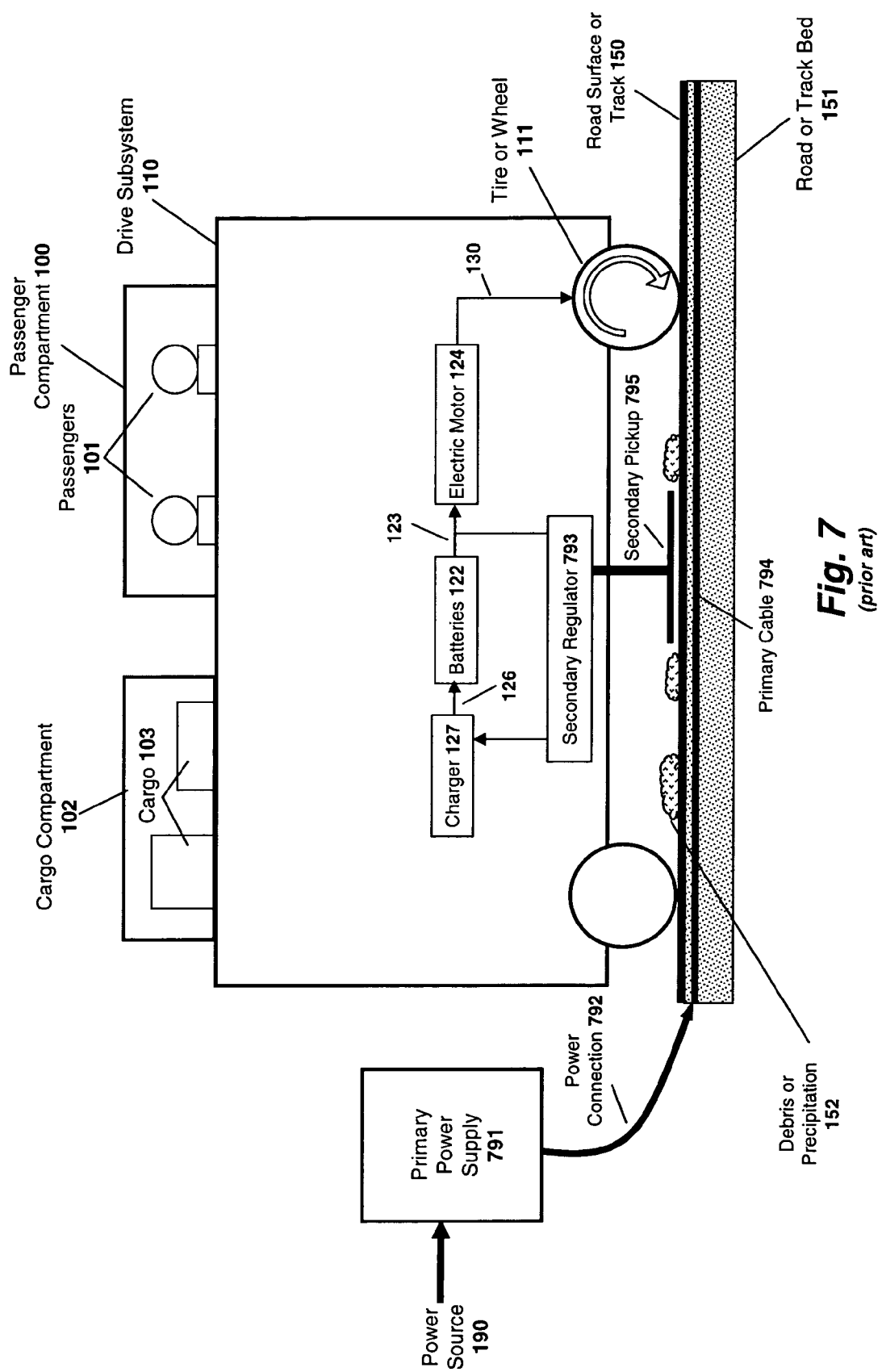
FIG. 7 illustrates a prior art inductively-powered electric vehicle.
Figure 8:
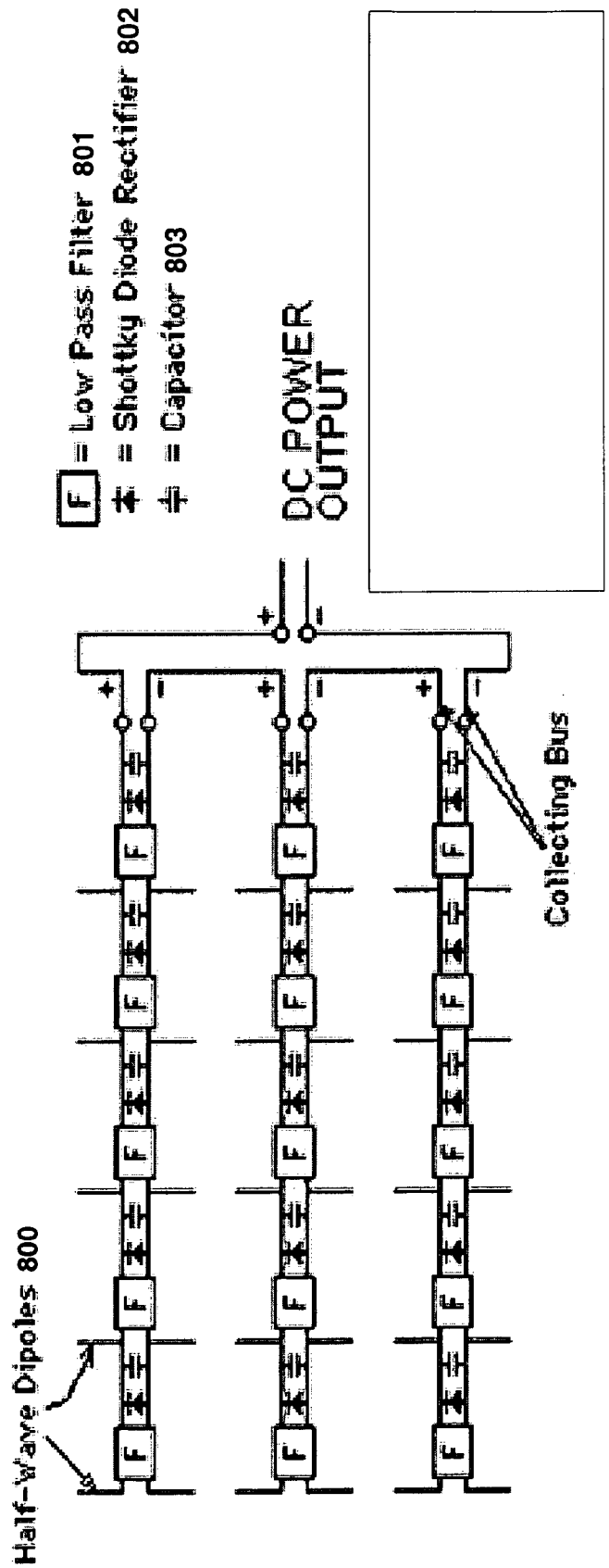
FIG. 8 illustrates a prior art rectifying antenna or "rectenna."

Because power is transmitted using RF, there are substantial advantages over prior art road power systems. Unlike prior art conductively-powered vehicles, such as the one shown in FIG. 6, there is no conductive tether to a power rail or cable 691, and as a result the vehicle illustrated in FIG. 9 has as much mobility as a conventional IC-powered car. Unlike prior inductively-powered vehicles, such as the one shown in FIG. 7, there is no secondary pickup 795 that has to be closely and precisely positioned relative to the primary cable 794. RF power 174 in FIG. 9 will penetrate road or track bed 151, road surface 150, and debris or precipitation 152. And then RF power 174 will transmit through air to rectenna 160, allowing normal clearance between the bottom of the vehicle and the roadway. The precise height and positioning of rectenna 160 relative to antenna 173 can be widely variable (e.g. on the order of 4 feet), and as a result the imprecision that occurs in typical driving from bumps in the road or driver imprecision can be tolerated. The only consequence to imprecise positioning will be some loss of efficiency of the power transmission if the RF transmission 174 partially misses rectenna 160.

In one embodiment, only authorized drivers are provided with access to the RF transmissions from the RF generators 171. For example, in one embodiment, the RF power system described herein is a pay service and only those drivers who subscribe to the service (and who are in good standing) will be provided with access.

To this end, in one embodiment, an authorization and control module 176 is configured to identity authorized drivers and to turn RF generator 171 on only for those drivers via control link 175. In one embodiment, authorization and control module 176 includes an antenna 178 allowing the authorization and control module 176 to wirelessly communicate with identification and control logic 162 configured within the vehicle. As illustrated, the identification and control logic 162 is also equipped with an antenna 164 which, in one embodiment, is positioned on the underside of the vehicle. In operation, as the vehicle travels over the roadway 150, the authorization and control module 176 establishes communication over the wireless channel and reads identification data from the identification and control logic 162 uniquely identifying the driver and/or the vehicle. In one embodiment, the identification data is a serial number associated with the vehicle. However, various other types of identification data may be used while still complying with the underlying principles of the invention. If the driver/vehicle is authorized to use the power system, then the authorization and control module 176 will turn RF generator 171 on as the vehicle passes by, thereby providing power to the vehicle. If the driver/vehicle is not authorized, then the authorization and control module 176 will not turn RF generator 171 on.

Various different configurations for authorization and control module 176 and identification and control logic 162 are contemplated within the scope of the present invention. For example, in one embodiment, the same wireless technology as that currently used to provide access to bridges and tunnels in many metropolitan areas may be employed. One example of this is the "E-Z Pass$^{SM}$" used on several toll bridges and toll roads in the northeastern United States. E-Z Pass$^{SM}$ tags are RFID transponders which communicate with equipment built into the toll collection lanes. The most common type of tag is mounted on the inside of the vehicle's windshield behind the rearview mirror. Some vehicles have windshields that block RFID signals. For those vehicles, an externally-mountable tag may be used, typically designed to attach to the vehicle's front license plate mounting points.

Figure 12:
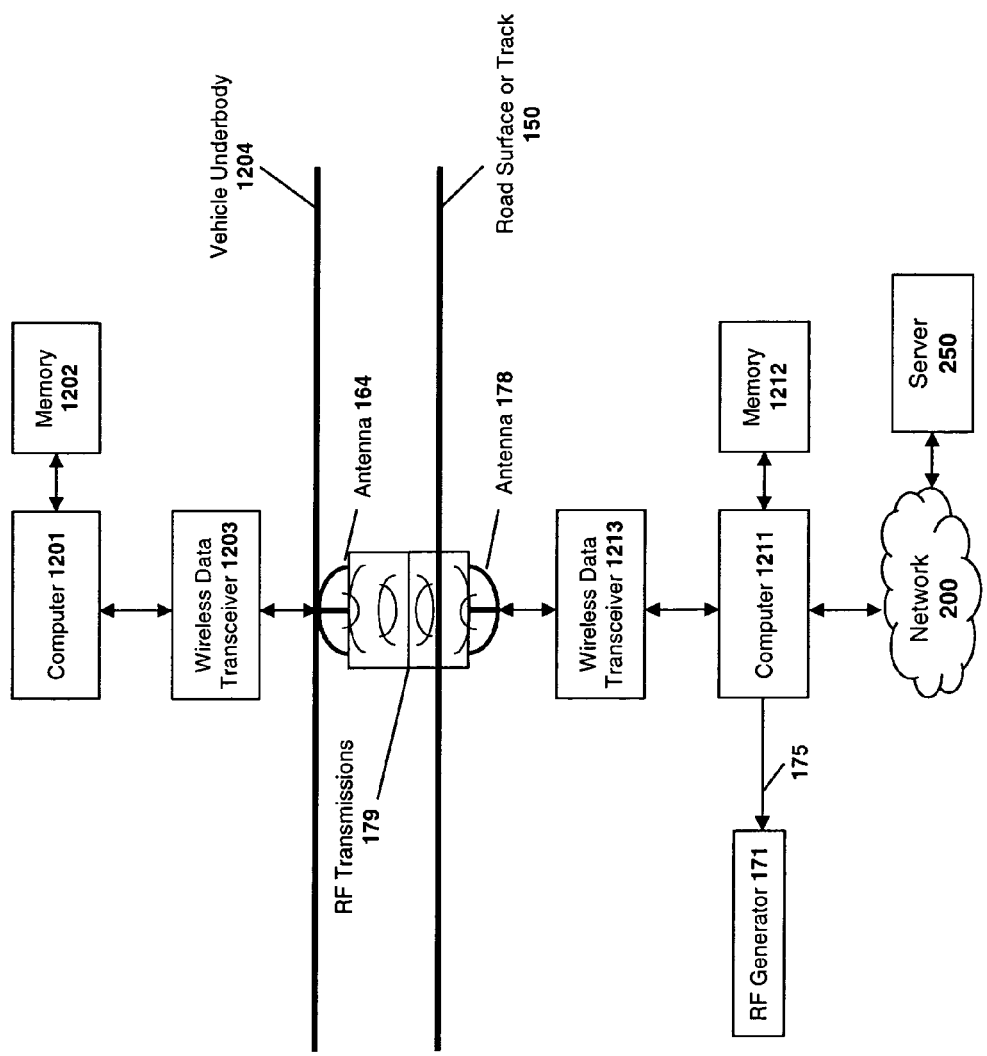
FIG. 12 illustrates a wireless communication architecture employed in one embodiment of the invention.

In one embodiment, identification and control logic 162 and authorization and control module 176 are implemented as detailed in FIG. 12. Identification and control logic 162 of FIG. 9 is implemented by means of computer 1201, memory 1202, and wireless data transceiver 1203. Authorization and control module 176 of FIG. 9 is implemented by means of computer 1211, memory 1212, and wireless data transceiver 1213. Computers 1201 and 1211 are implemented using by using EPIA PC 10000 LVDS PC motherboards, available from VIA Technologies™, Inc. of Taiwan, running the Windows XP® Professional operating system from Microsoft® Corporation. Memory 1202 and 1212 are implemented using commercially available 64 MByte USB Flash Memory modules, plugged into USB ports on computers 1201 and 1211. Wireless data transceivers 1203 and 1213 are implemented using MiniLink® Wireless Ethernet adapters from MicroTek® Electronics of San Clemente, Calif., and they are coupled to Ethernet ports on computers 1201 and 1211, configured to transmit at 5.260 GHz. The wireless data transceivers 1203 and 1213 are coupled to directional antennas 164 and 178. Although the antennas are shown as external parabolic antennas in FIG. 12 for the sake of illustrating directionality, in one embodiment, they are actually patch antennas that are integral to the MiniLink® product. Antenna 164 is mounted on the underbody 1204 of the vehicle. Antenna 178 is embedded under the roadway surface or track 150. In the case of a track, such as that of a train, antenna 178 is placed between the tracks in the track bed.

Figure 13:
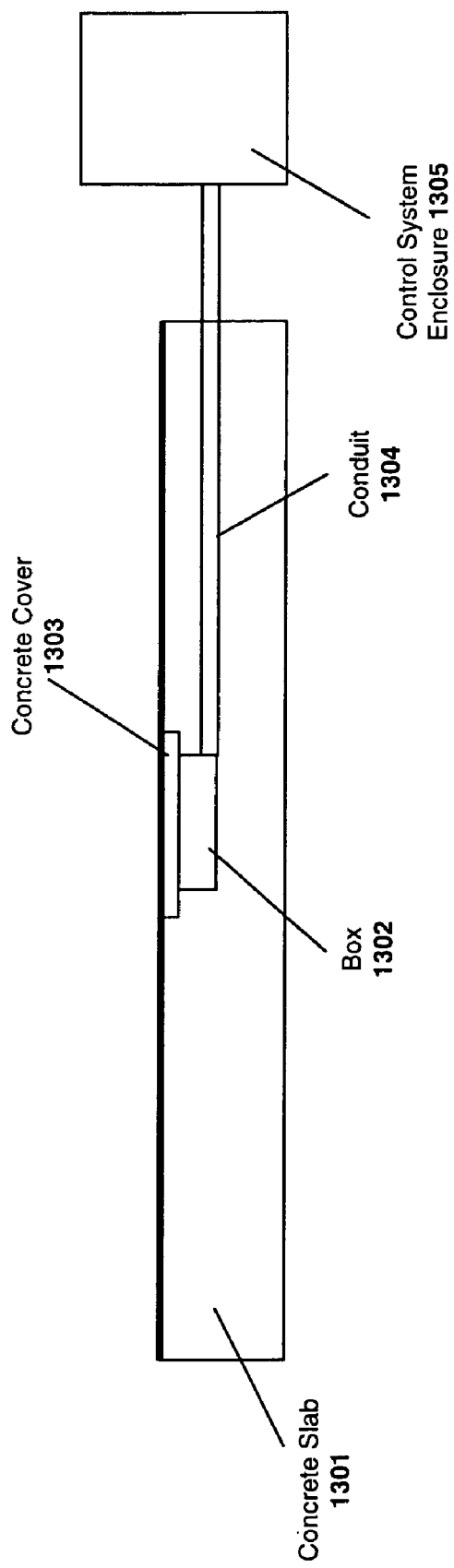
FIG. 13 illustrates one embodiment in which a steel box and conduit are embedded beneath the road surface and includes a control system enclosure for housing a control system.

The MiniLink® product is designed to transmit as far as 30 miles in open air line-of-sight applications, up to 40 Mbps. In a typical road environment, the required transmission distance is much shorter (e.g. 1-2 feet), but there are physical obstacles. The transmission will need to pass in both directions from antenna 178 through a road surface, through debris or precipitation on the road, through 1 to 2 feet of air, and then through any dirt or grime that has accumulated on antenna 164. Of course, it is possible to bury antenna 178 very deeply, or under a road surface 150 that blocks RF in the 5 GHz band (e.g., a road surface made of solid steel), in such a manner that the RF signal would be unable to penetrate through the road, but there are many practical materials and practical thicknesses that can be used. FIG. 13 (not drawn to scale) illustrates one such practical embodiment. The road surface is made of a concrete slab 1301 that is 12 inches thick and made of portland cement. A steel box 1302 (with an open top) is embedded in concrete slab 1301 when the cement is poured that is large enough to accommodate the MiniLink® product (the MiniLink® dimensions are 2.6"×2.6"×1.1"). A 1 inch thick concrete cover 1303 is placed on top of box 1302, typically made of steel. Conduit 1304, typically made of steel, is also embedded in concrete slab 1301 when it is poured, and carries a power cable and an Ethernet cable to the MiniLink® product from a weatherproof enclosure on the side of the roadway where computer 1211 and memory 1212 are located. The MiniLink® patch antenna is pointed upward, and RF is transmitted through concrete cover 1303.

RF generator 171 of FIG. 9 can be implemented using any of many commercially available RF power generator systems, typically implemented using a magnetron at microwave frequencies, for example, 2.45 GHz. In one embodiment Magnetron Generator model VIS-201 from CPI Wireless Solutions® of Palo Alto, Calif. is used. The VIS-201 is capable of generating from 1.5 to 30 KWatts of RF output. RF generator 171 is coupled to a transmitting antenna 173 through either a cable or waveguide 172. Transmitting antenna 173 typically is a directional antenna, which can be implemented as a parabolic dish, a yagi antenna or many other prior art directional antennas. Also, transmitting antenna 173 can be implemented as a prior art group of antennas in a phased array with the RF signal appropriately processed to shape the antenna output in a directional beam. In this embodiment the antenna 173 is a parabolic dish.

Figure 14:
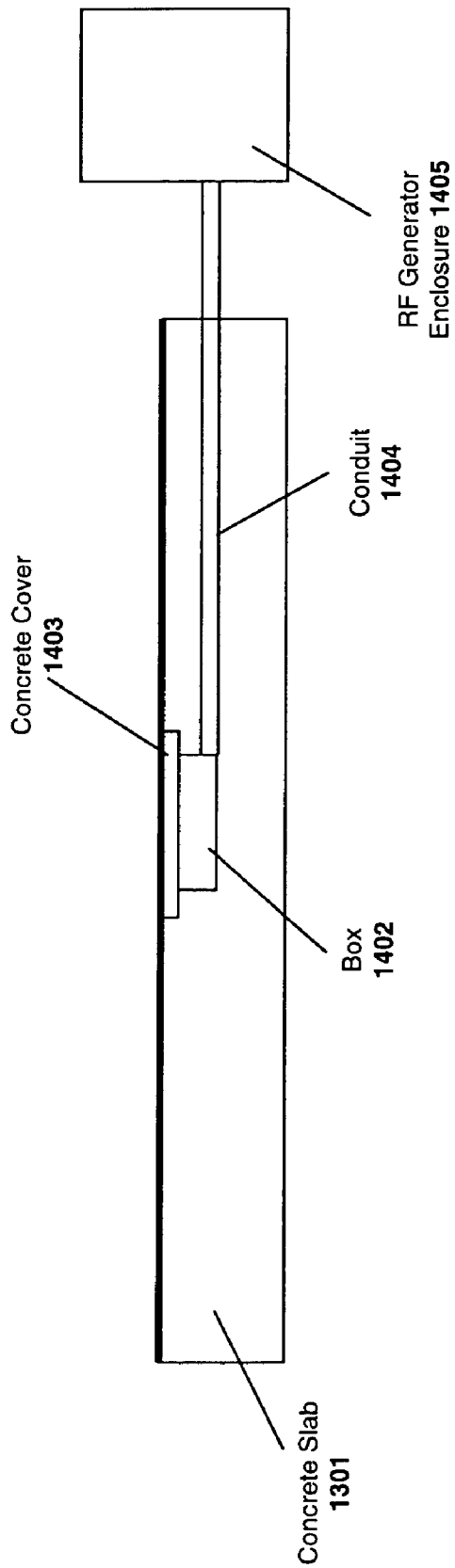
FIG. 14 illustrates one embodiment which includes a weatherproof enclosure for housing an RF generator.

FIG. 14 shows one embodiment where these subsystems would be placed. Weatherproof enclosure 1405 is located on the side of the road for RF generator 171. Conduit 1404 (typically made of steel) to house cable or waveguide 172 is embedded in concrete slab 1301 when it is poured. Antenna 173 is housed in box 1402, which is placed in the concrete slab 1301 when it is poured. Concrete cover 1403 is a 1 inch thick concrete cover for box 1402.

Figure 15:
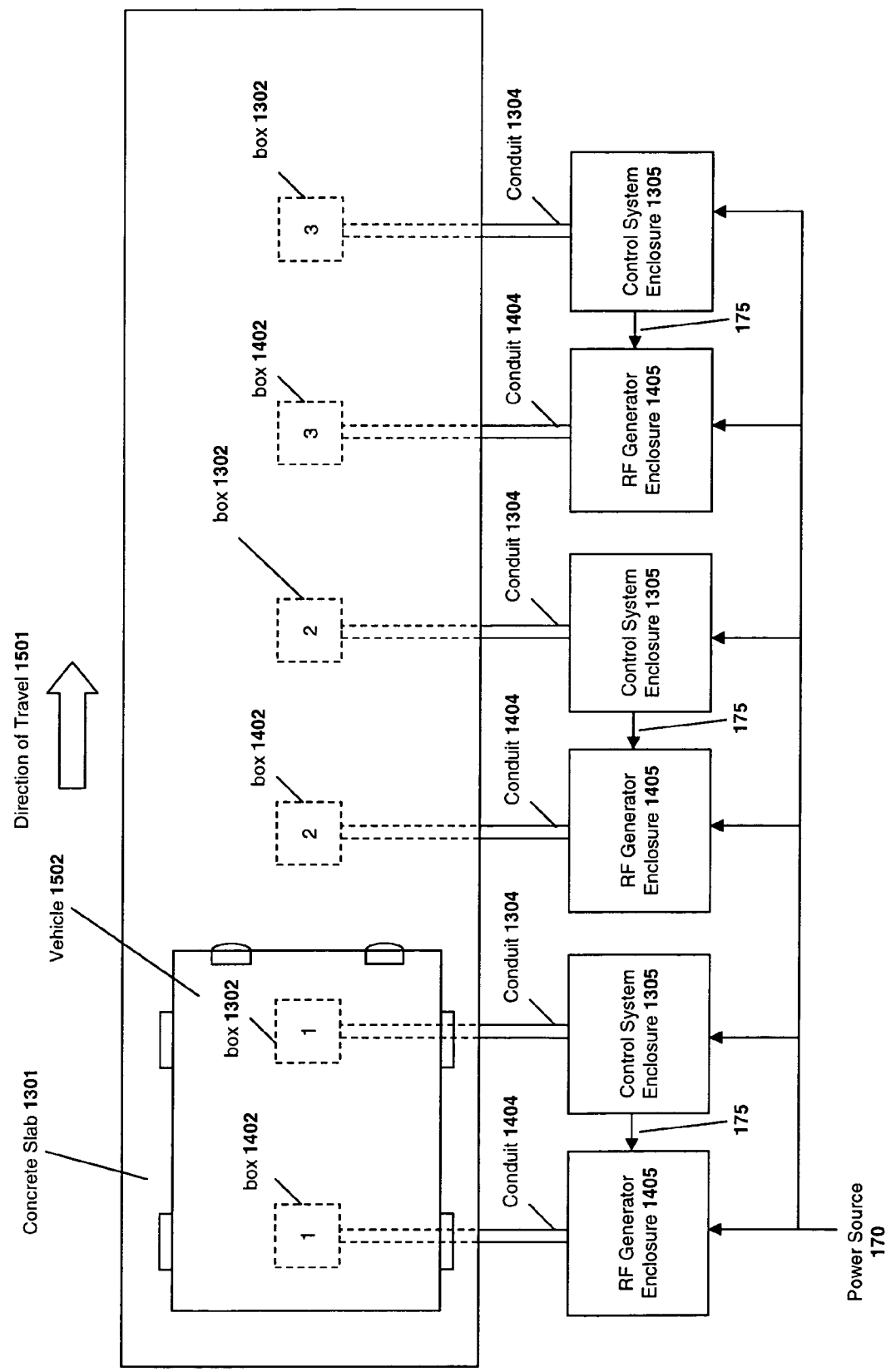
FIG. 15 illustrates a bird's eye architectural view of a system according to one embodiment of the invention.

FIG. 15 shows one embodiment of a plan (overhead) view of the structures illustrated in FIGS. 13 and 14. Concrete slab 1301 forms a short segment of roadway roughly 50 feet long (in practice, the roadway so configured would stretch for miles). Vehicle 1502 is shown moving on the roadway in direction of travel 1501. At the moment in time shown, vehicle 1502 is about one-third of the way down segment 1301 of roadway.

Three RF power subsystems are shown in FIG. 15, with their respective boxes containing their antennas numbered 1, 2, and 3. Each subsystem consists of an authorization and control system 176, housed in enclosure 1305 and an RF generator 171, housed in enclosure 1405. The previously described connections from enclosures 1305 and 1405 are routed through conduits 1304 and 1404, respectively, to boxes 1302 and 1402, respectively. Conduits and boxes 1305, 1405,1302 and 1402 are shown with dashed lines where they are embedded in concrete slab 1301. Wireless data transceiver 1213 and antenna 176 are located in box 1302 and antenna 173 is located in box 1402.

In one embodiment, vehicle 1502 is the same vehicle that is illustrated in FIG. 9. When vehicle 1502 drives over concrete slab 1301, its identification and control system 162 is constantly and repeatedly transmitting an identification number through antenna 164, modulated as a digital signal by wireless data transceiver 1203. This identification number may have been pre-programmed into memory 1202 of FIG. 12 when the car was manufactured and uniquely identifies the vehicle 1502.

When antenna 164 passes over the box 1302 of FIG. 15 numbered 1, antenna 178 within box 1302 receives the signal, wireless data transceiver 1213 demodulates the signal, and transmits vehicle 1502's identification through Ethernet to computer 1211. Computer 1211 compares the identification number to a database of authorized identification numbers in memory 1212, and if it determines that vehicle 1502 is authorized to be transmitted power, it sends a "transmit power" message through cable 175 to RF generator 171. Then, RF generator 171 transmits power through cable or waveguide 172 to antenna 173, which modulates RF energy 174.

In one embodiment, each pair of boxes 1302 and 1402 are placed a consistent distance of 8 feet apart. Because vehicle 1502's antenna 164 is directional, when it establishes contact with antenna 178, it will be located roughly over antenna 178. Since it is known that box 1402 with RF power transmitting antenna 173 has 8 feet between it and antenna 178, vehicle 1502 is manufactured with its rectenna 160 located 8 feet behind antenna 164. So, when antenna 173 begins transmitting RF power, rectenna 160 is above it and receives the RF power. As previously described, rectenna 160 rectifies the RF power to DC current, which is coupled through cable 161 to charger 127, which then charges batteries 122 to propel the vehicle 1502.

As the vehicle 1502 continues move to the right, eventually antenna 164 loses contact with antenna 178. When this is detected by the authorization and control system 176, it sends a message to RF generator 171 to stop transmitting RF power.

Eventually, vehicle 1502 passes over the second pair of boxes 1302 and 1402 (numbered 2 in FIG. 15). At this point, the exact same process of vehicle identification and authorization, followed by RF power activation and deactivation, occurs, providing vehicle 1502 with another interval of RF power. And, the same process occurs with vehicle 1502 passes over the third pair of boxes 1302 and 1402 (numbered 3 in FIG. 15), and so on. In this way, vehicle 1502 receives a steady sequence of intervals of RF power as it proceeds down the roadway.

Although the distance between antennas 173 and 178 is the same as the distance between antennas 160 and 164, respectively, in FIG. 15, different distances may also be used. For example, to account for the speed of the vehicle and the average time required for authorization and control logic 176 to provide authorization and for RF generator 171 to begin transmitting power in one embodiment, the distance between antennas 173 and 178 may be slightly greater than the distance between antennas 160 and 164 (e.g., 9 feet).

In one embodiment, the authorization and control logic 176 in FIG. 9 communicates with a remote server 250 over a data network 200. The remote server 250 includes a database containing the set of drivers/vehicles who are authorized to use the RF power system described herein. The remote server 250 may continually and/or periodically update this information on authorization and control module 176 to ensure that the authorization and control module 176 includes up-to-date driver/vehicle information. The data network 200 can be a wireless or wired network, a propriety network link or a link to the Internet such as a T1 line or DSL line.

In one embodiment, RF generator 171 in FIG. 9 transmits power constantly, and all vehicles in the lane are permitted to receive power. In this embodiment, identification and control subsystem 162 and authorization and control subsystem 176 are unnecessary.

In another embodiment, RF generator 171 in FIG. 9 transmits power constantly, but rather than authorization and control subsystem 176 causing RF generator 171 to stop transmitting power when an unauthorized vehicle passes, authorization and control subsystem 176 transmits a message to identification and control subsystem 162 that it is not authorized to receive power, and identification and control subsystem 162 sends a message to charger 127 (through a cable connection not shown) that it should decouple any power received on cable 161 received by the rectenna 160. This embodiment would be a useful configuration if RF generator 171 could not be switched on and off quickly.

Figure 10:
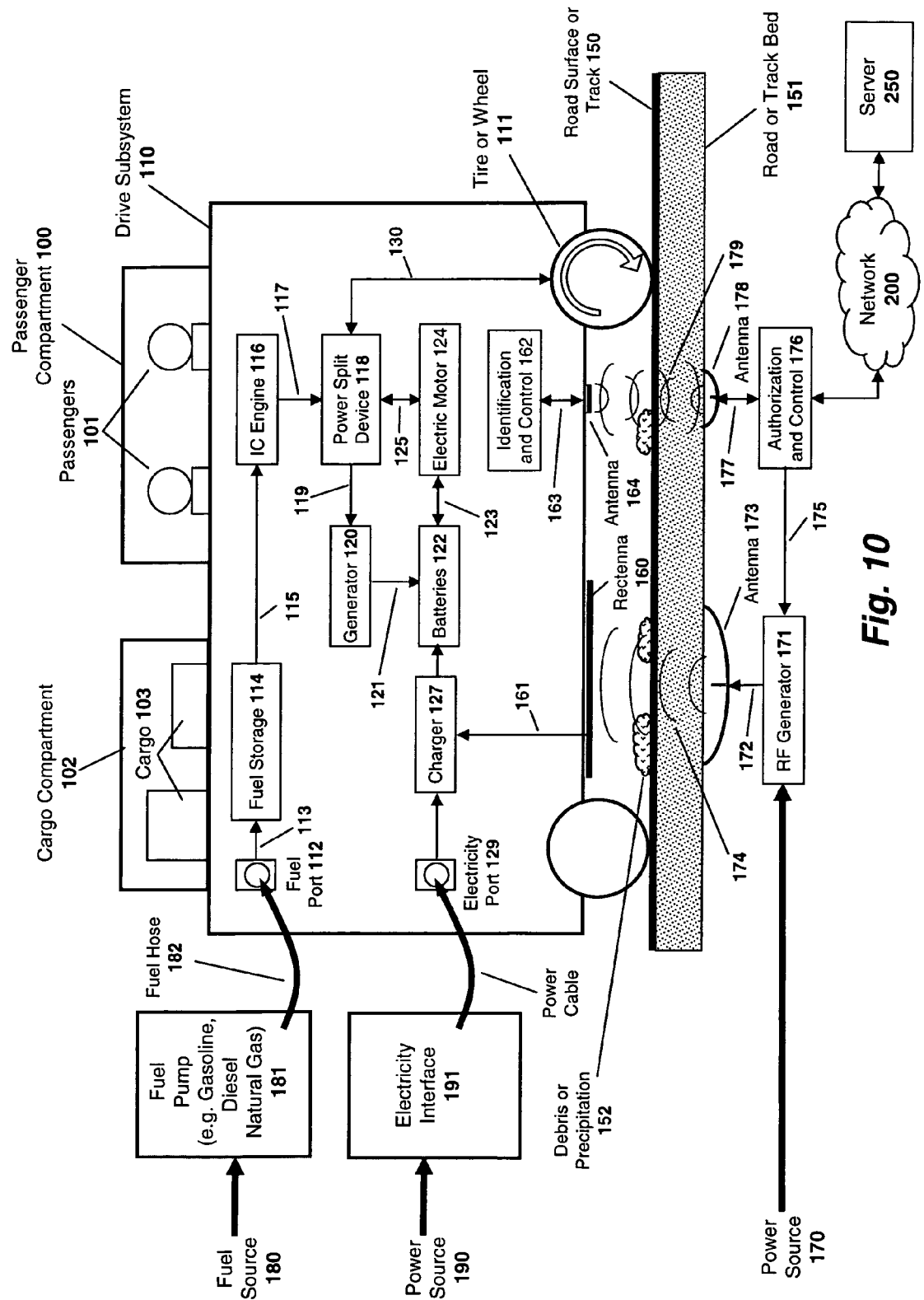
FIG. 10 illustrates another embodiment of the invention in which RF generators are configured beneath the road surface.

FIG. 10 illustrates one embodiment of the invention in which, in addition to the rectenna input 161, charger 127 is provided with an electricity port 129 for connecting the charger to an external power source 190 (e.g., a standard 120 V AC power input). As in prior electric vehicles, the electricity interface 191 may include a set of connectors, a regulator and/or a transformer.

Figure 1:
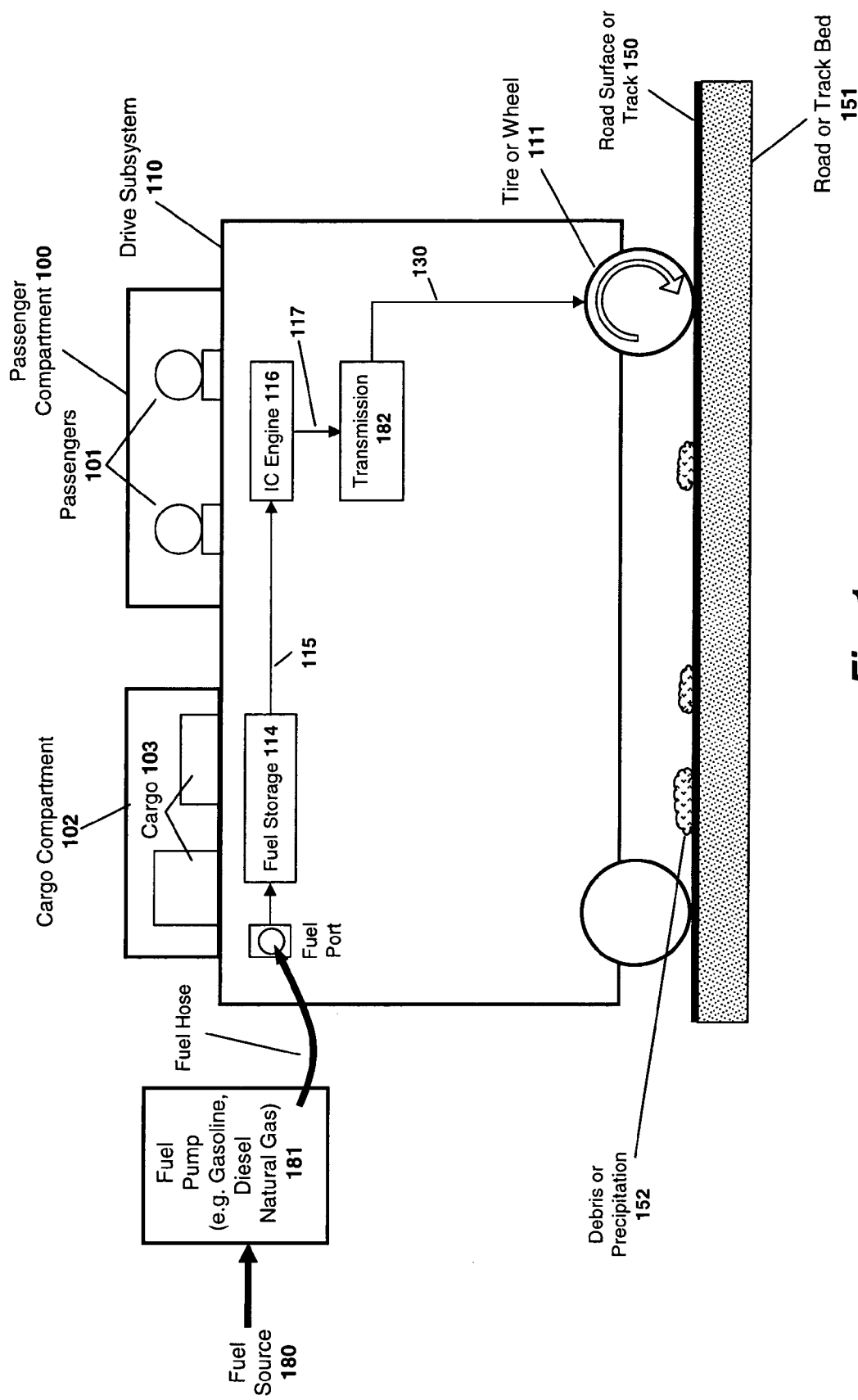
FIG. 1 illustrates a prior art internal combustion ("IC") vehicle which runs on fossil fuels.
Figure 2:
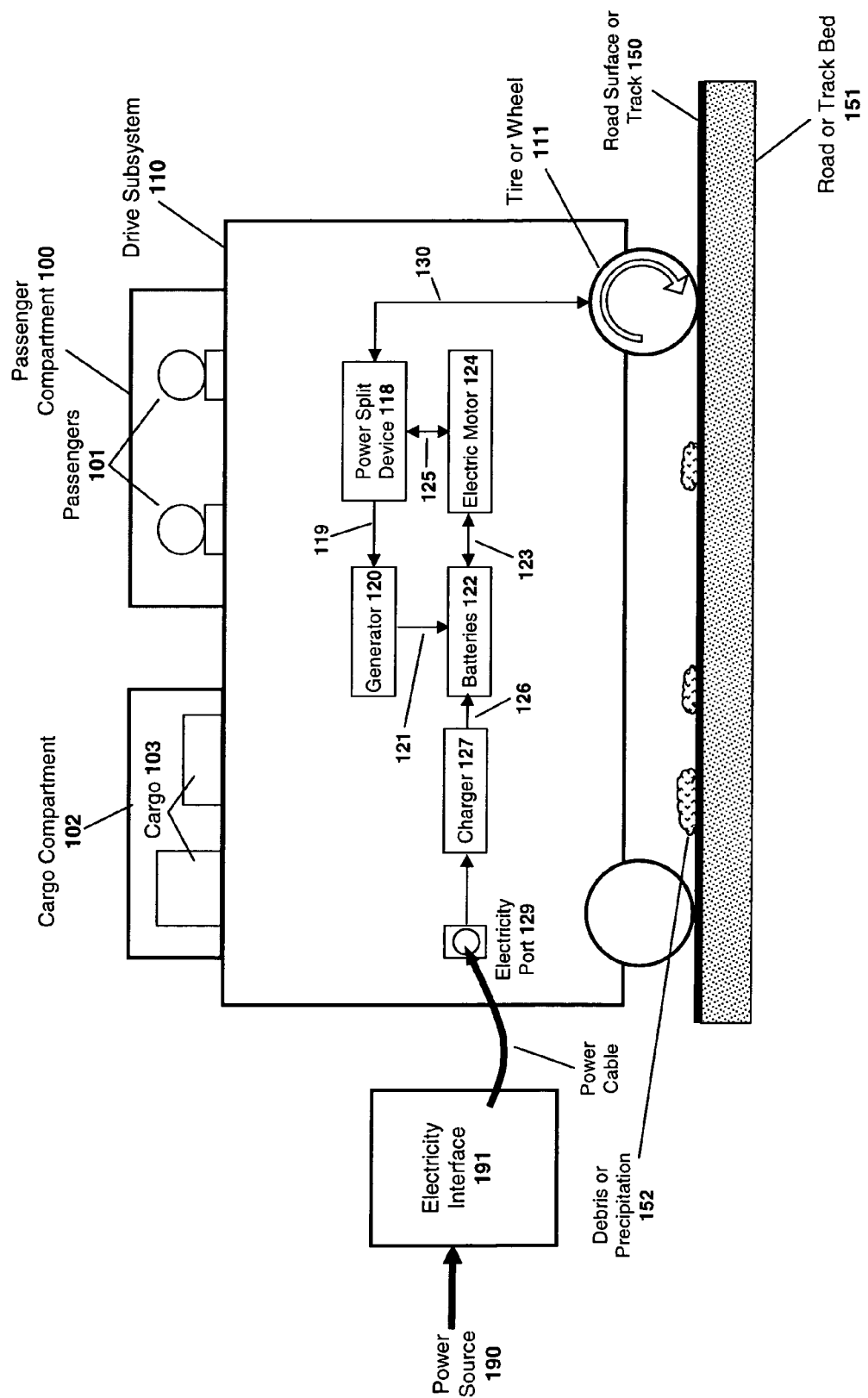
FIG. 2 illustrates a prior art electric vehicle which is powered by a set of rechargeable batteries.
Figure 3:
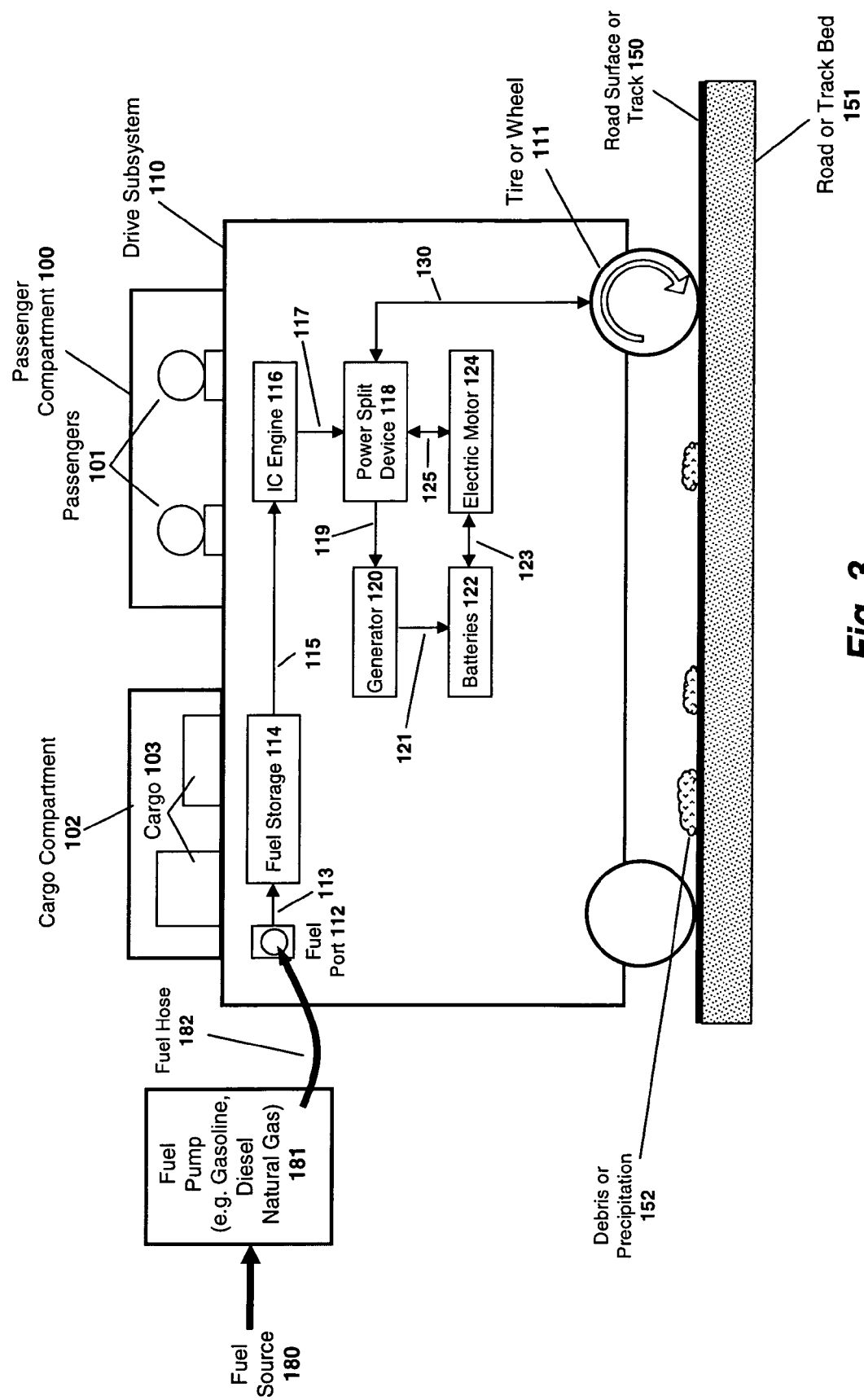
FIG. 3 illustrates a prior art IC-electric hybrid vehicle which is powered by both fossil fuel and batteries.
Figure 4:
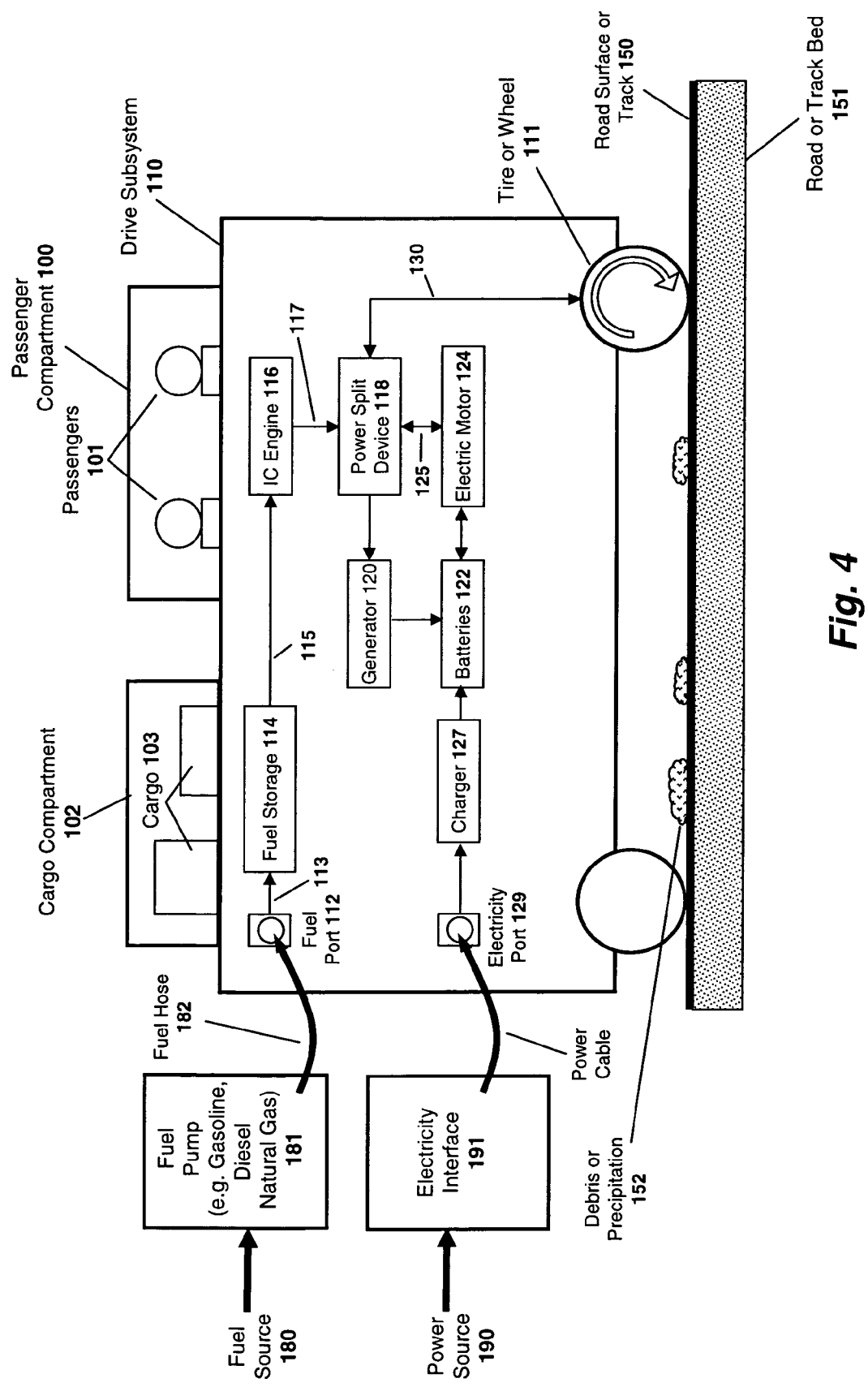
FIG. 4 illustrates a prior art "plug-in" IC-electric hybrid vehicle which can be charged via an electricity port.
Figure 5:
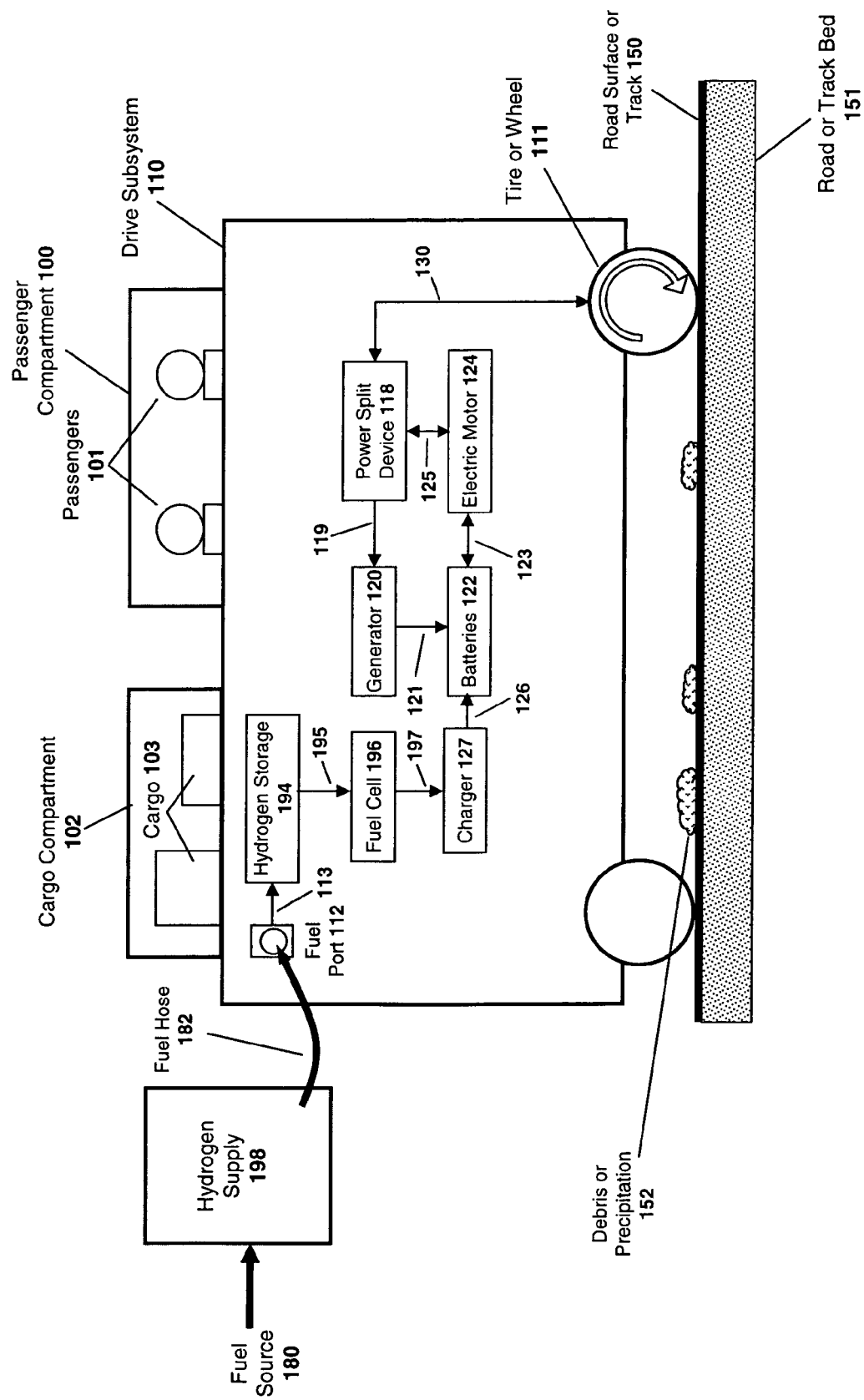
FIG. 5 illustrates a prior art hydrogen fuel cell vehicle which is powered by hydrogen.
Figure 11:
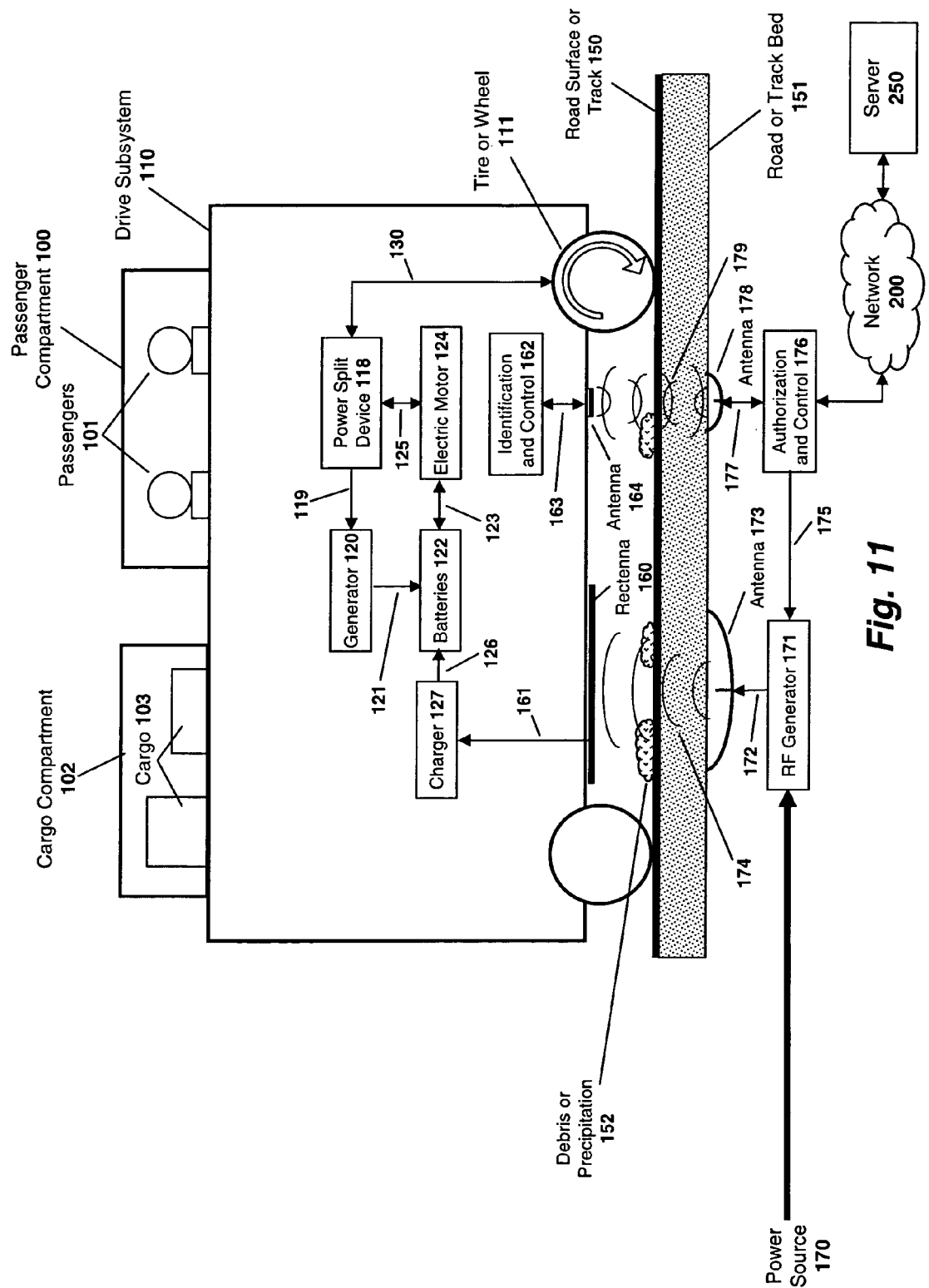
FIG. 11 illustrates one embodiment of the invention in which the only power source for a vehicle are RF generators configured beneath the road surface.

The embodiments in FIGS. 9 and 10 provide alternate power options in case the road over which the vehicle is traveling does not include RF generators 171. For example, the vehicles shown in FIGS. 9 and 10 could operate as conventional hybrid vehicles, such as those described in FIGS. 3 and 4 when on roads which do not include RF generators. However, when a large percentage of all roadways have been configured with RF generators, vehicles may be produced which rely upon RF power most of the time, and run on batteries 122 during the short stretches of roadway where RF power is not available. As illustrated in FIG. 11, this type of vehicle does not have an IC engine or an alternate input for charging the set of batteries 122. In an alternative embodiment, the vehicle illustrated in FIG. 11 may have an additional port for physically attaching electric power for use in areas were RF-powered roadways are not commonly available.

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

What is claimed is:

1. A method comprising:
   positioning a plurality of RF generators beneath the road surface of a roadway, the RF generators configured to transmit RF signals in a fixed, upward direction towards vehicles traveling over the roadway;
   identifying a particular driver and/or vehicle driving over the roadway;
   determining whether the driver and/or vehicle is authorized to receive the RF signals;
   selectively transmitting the RF signals only if the driver and/or vehicle is authorized to receive the RF signals;
   coupling a rectenna to the underside of a vehicle, the rectenna configured to receive the RF signals transmitted from the RF generators and to generate power from the RF signals; and
   using the power generated by the rectenna to power the vehicle.

2. The method as in claim 1 wherein identifying further comprises wirelessly reading identification data uniquely identifying the driver and/or vehicle from an identification module configured on or within the vehicle.

3. The method as in claim 2 further comprising:
positioning a plurality of authentication and control modules beneath the road surface of a roadway, the authentication and control modules having antennas configured to wirelessly communicate with a wireless module on the vehicle, the wireless module communicatively coupled to identification and control logic in which the identification data is stored.

4. The method as in claim 1 wherein using the power comprises providing the power to a charger, the charger using the power to charge a set of batteries within the vehicle, the batteries powering an electric motor.

5. A system for powering a vehicle comprising:
a plurality of RF generators positioned beneath a road surface of a roadway, the RF generators configured to transmit RF signals in a fixed, upward direction towards vehicles traveling over the roadway,
a plurality of authorization/control modules positioned beneath the road surface, the authorization/control modules configured to identify a particular driver and/or vehicle driving over the roadway, to further determine whether the driver and/or vehicle is authorized to receive the RF signals, and to cause the RF generators to selectively transmit the RF signals only if the driver and/or vehicle are authorized to receive the RF signals;
a rectenna coupled to the underside of a vehicle, the rectenna configured to receive the RF signals transmitted from the RF generators and to generate power from the RF signals; and
a rechargeable power source within the vehicle, the rechargeable power source capable of being recharged by the power generated by the rectenna.

6. The system as in claim 5 wherein the rectenna comprises an arrangement of low pass filters, rectifiers and capacitors.

7. The system as in claim 5 wherein the RF generators are configured to transmit RF signals within the microwave spectrum.

8. The system as in claim 5 further comprising:
a plurality of RF transceivers coupled to the plurality of authorization/ control modules, the RF transceivers allowing the plurality of authorization/control modules to wirelessly read identification data from the vehicle, the identification data uniquely identifying the driver and/or vehicle.

9. The system as in claim 8 further comprising:
an identification/control module configured within the vehicle, the identification/control module storing the identification data.

10. The system as in claim 9 wherein the identification data comprises a serial number.

11. The system as in claim 5 wherein the rechargeable power source comprises a set of batteries.

12. The system as in claim 11 further comprising:
a charger unit to recharge the set of batteries using power generated by the rectenna.

13. The system as in claim 12 further comprising:
an electric motor configured to receive power form the set of batteries.

14. The system as in claim 13 further comprising:
an internal combustion ("IC") engine configured to run on fossil fuel;
a power split device to apply torque to a drive shaft, the torque generated from running the IC engine and/or the electric motor.

15. The system as in claim 14 further comprising:
a electricity port electrically coupled to the charger, the electricity port including an interface to allow the charger to receive power from an external power source.

16. A system comprising:
RF generator means positioned beneath a road surface of a roadway, the generator means configured to transmit RF signals in a fixed, upward direction towards vehicles traveling over the roadways,
authorization/control means positioned beneath the road surface, the authorization/control means configured to identify a particular driver and/or vehicle driving over the roadway, to further determine whether the driver and/or vehicle is authorized to receive the RF signals, and to cause the RF generators to selectively transmit the RF signals only if the driver and/or vehicle are authorized to receive the RF signals;
rectenna means coupled to the underside of a vehicle, the rectenna means configured to receive the RF signals transmitted from the RF generator means and to generate power from the RF signals; and
rechargeable power source means within the vehicle, the rechargeable power source means capable of being recharged by the power generated by the rectenna.

17. The system as in claim 16 wherein the authorization/ control means comprises RF transceivers coupled to the plurality of authorization/control means, the RF transceivers allowing the plurality of authorization/control means to wirelessly read identification data from the vehicle, the identification data uniquely identifying the driver and/or vehicle.

* * * * *